United States Patent
Kontani et al.

(10) Patent No.: US 10,508,625 B2
(45) Date of Patent: Dec. 17, 2019

(54) AIR CLEANER FOR VEHICLE

(71) Applicant: HONDA MOTOR CO., LTD., Tokyo (JP)

(72) Inventors: Masahiro Kontani, Wako (JP); Ken Kojika, Wako (JP); Toshiaki Deguchi, Wako (JP); Yoichi Takahashi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 167 days.

(21) Appl. No.: 15/435,381

(22) Filed: Feb. 17, 2017

(65) Prior Publication Data
US 2017/0284346 A1    Oct. 5, 2017

(30) Foreign Application Priority Data
Mar. 31, 2016    (JP) .................... 2016-072121

(51) Int. Cl.
*B01D 46/00* (2006.01)
*B01D 46/42* (2006.01)
(Continued)

(52) U.S. Cl.
CPC ............ *F02M 35/048* (2013.01); *B62J 99/00* (2013.01); *F02M 35/0201* (2013.01);
(Continued)

(58) Field of Classification Search
CPC ........ B01D 46/00; B01D 46/42; B01D 46/46; B01D 50/00; B01D 53/22; F02M 35/024;
(Continued)

(56) References Cited

U.S. PATENT DOCUMENTS

| 4,878,555 A | 11/1989 | Yasunaga et al. |
| 8,377,161 B2 * | 2/2013 | Lee .................... F02F 7/006 |
| | | 123/198 E |

(Continued)

FOREIGN PATENT DOCUMENTS

JP    2015-45320 A    3/2015

OTHER PUBLICATIONS

Canadian Official Communication, dated Jan. 11, 2018, for Canadian Application No. 2,959,348.

*Primary Examiner* — Minh Chau T Pham
(74) *Attorney, Agent, or Firm* — Birch, Stewart, Kolasch & Birch, LLP (57) ABSTRACT

In an air cleaner for a vehicle, a connection part of a first intake duct to a cleaner case is disposed in a front half portion of one of left and right half portions of the cleaner case, the first intake duct including a first air inlet port opening forward. A connection part of a second intake duct to the cleaner case is disposed in a rear half portion of an other of the left and right half portions, the second intake duct including a second air inlet port opening rearward. The first intake duct is formed to include a first air outlet port opening rearward inside an unpurified chamber and curve in an up-down direction in a side view, and the second intake duct is formed to include a second air outlet port opening forward inside the unpurified chamber and curve in a right-left direction in a plan view.

11 Claims, 9 Drawing Sheets

(51) Int. Cl.
*B01D 46/46* (2006.01)
*B01D 50/00* (2006.01)
*B01D 53/22* (2006.01)
*B60K 13/02* (2006.01)
*F02M 35/024* (2006.01)
*B62M 7/02* (2006.01)
*F02M 35/04* (2006.01)
*B62J 99/00* (2009.01)
*F02M 35/02* (2006.01)
*F02M 35/10* (2006.01)
*F02M 35/16* (2006.01)

(52) U.S. Cl.
CPC .............. *F02M 35/10124* (2013.01); *F02M 35/10131* (2013.01); *B62M 7/02* (2013.01); *F02M 35/162* (2013.01); *Y02T 10/14* (2013.01)

(58) Field of Classification Search
CPC ........... F02M 35/0204; F02M 35/1255; F02M 35/048; F02M 35/10131; F02M 35/10124; F02M 35/162; B60K 13/02; B62M 7/02
USPC ................ 55/385.3; 123/198 E; 180/68.3
See application file for complete search history.

(56) References Cited

U.S. PATENT DOCUMENTS

| | | | |
|---|---|---|---|
| 8,535,403 B2* | 9/2013 | Patwardhan | B01D 46/125 55/385.3 |
| 9,347,406 B2* | 5/2016 | Abe | B62K 19/48 |
| 2009/0084344 A1* | 4/2009 | Fasan | B60K 13/02 123/198 E |
| 2009/0282793 A1* | 11/2009 | Tomlin | F02M 25/0854 55/385.3 |
| 2010/0050865 A1* | 3/2010 | Johnson | B01D 46/002 95/17 |
| 2011/0233983 A1* | 9/2011 | Lu | A47C 7/448 297/383 |
| 2012/0110964 A1* | 5/2012 | Alexander | B01D 46/0004 55/385.3 |
| 2013/0192912 A1* | 8/2013 | Shimomura | F02M 35/02416 180/68.3 |
| 2015/0034405 A1 | 2/2015 | Abe et al. | |
| 2016/0102637 A1* | 4/2016 | Desjardins | F02M 35/1266 55/385.3 |
| 2016/0177889 A1* | 6/2016 | Matsubara | F02M 35/10137 55/385.3 |

* cited by examiner

AIR CLEANER FOR VEHICLE

BACKGROUND OF THE INVENTION

Field of the Invention

The present invention relates to an air cleaner for a vehicle, comprising: a cleaner case; a cleaner element stored within the cleaner case so as to separate an inside of the cleaner case into a purified chamber and an unpurified chamber; and first and second intake ducts connected to the cleaner case so as to suck external air to the unpurified chamber.

Description of the Related Art

An air cleaner for a vehicle increasing an intake air volume by connecting a pair of intake ducts to the air cleaner is known in Japanese Patent Application Laid-open No. 2015-45320. In this air cleaner for a vehicle, the pair of intake ducts directing an air intake port to vehicle rearward is curvingly formed so as to open inward in a vehicle width direction so that air outlets become close to each other within an unpurified chamber.

However, in the air cleaner disclosed in Japanese Patent Application Laid-open No. 2015-45320, there is a case that mutual interference of intake air introduced into the unpurified chamber from the air outlets of the pair of intake ducts occurs and suction resistance increases. Therefore, when further increase of the intake air volume is required due to a circumstance of intending to increase displacement of an internal combustion engine and so on, it is required to increase a sectional opening area of the intake duct and to increase the number of the intake ducts. In such a case, there is a risk of affecting a layout in a whole vehicle.

SUMMARY OF THE INVENTION

The present invention has been achieved in view of the above-mentioned circumstances, and it is an object thereof to provide an air cleaner for a vehicle capable of improving suction efficiency and increasing an intake air volume without increasing a sectional opening area of an intake duct and the number of intake ducts.

In order to achieve the object, according to a first feature of the present invention, there is provided an air cleaner for a vehicle, comprising: a cleaner case; a cleaner element stored within the cleaner case so as to separate an inside of the cleaner case into a purified chamber and an unpurified chamber; and first and second intake ducts connected to the cleaner case so as to suck external air to the unpurified chamber, wherein a connection part of the first intake duct with respect to the cleaner case is disposed in a front half portion of one of a left half portion and a right half portion of the cleaner case, the first intake duct including a first air inlet port opening forward in an on-vehicle state, a connection part of the second intake duct with respect to the cleaner case is disposed in a rear half portion of an other of the left half portion and the right half portion of the cleaner case, the second intake duct including a second air inlet port opening rearward in an on-vehicle state, the first intake duct is formed so as to include a first air outlet port and curve in an up-down direction as seen in a side view, the first air outlet port opening rearward in an inside of the unpurified chamber, and the second intake duct is formed so as to include a second air outlet port and curve in a right and left direction as seen in a plan view, the second air outlet port opening forward in the inside of the unpurified chamber.

With the first feature of the present invention, the connection parts of the first and second intake ducts to the cleaner case are disposed respectively in the front half portion and the rear half portion of the cleaner case and disposed respectively in one and the other of the left half portion and the right half portion of the cleaner case, the air intake ports of the first and second intake ducts being respectively directed forward and rearward, the first intake duct is formed so as to include the first air outlet port and to curve in the up-down direction as seen in a side view, the first air outlet port opening rearward in the inside of the unpurified chamber, and the second intake duct is formed so as to include the second air outlet port and to curve in the right and left direction as seen in a plan view, the second air outlet port opening forward in the inside of the unpurified chamber. Therefore, the intake air can be circulated to the front, rear, right and left inside the unpurified chamber while suppressing mutual interference of the intake air from the first and second air outlet ports, and the suction efficiency can be improved and the intake air volume can be increased without increasing the sectional opening area of the intake duct and the number of the intake ducts.

According to a second feature of the present invention, in addition to the first feature, a single air discharge hole is arranged in the cleaner case at a position sandwiched between the first and second air outlet ports in a projection view to a plane perpendicular to a circulation direction of air passing through the cleaner element, the air discharge hole discharging purified air from the purified chamber.

With the second feature of the present invention, the single air discharge hole is disposed at a position sandwiched between the first and second air outlet ports in the projection view to the plane perpendicular to the circulation direction of the air passing through the cleaner element. Therefore, whirling of the intake air to the front, rear, right and left inside the unpurified chamber is promoted, flow of the air inside the cleaner case is promoted, and the suction efficiency can be further improved.

According to a third feature of the present invention, in addition to the first feature or the second feature, the second intake duct having a cross-section with an oval shape is disposed inside the unpurified chamber so that a major axis direction of the oval shape is allowed to be along a plane of the cleaner element facing the unpurified chamber.

With the third feature of the present invention, the second intake duct having the cross-section with an oval shape is disposed inside the unpurified chamber so that the major axis direction of the oval shape is allowed to be along the plane of the cleaner element facing the unpurified chamber. Therefore, it is easy to secure a space allowing the air to whirl inside the unpurified chamber, and mixing of the intake air inside the unpurified chamber can be promoted.

According to a fourth feature of the present invention, in addition to the first feature or the second feature, the cleaner case includes a bowl-shaped case main body and a cover member, the case main body being supported by a body frame, the cover member being detachably attached to the case main body so as to close an opening end of the case main body, and the first and second intake ducts are configured with tubular connection members and passage forming members, the connection members penetrating the cover member and being attached to the cover member, the passage forming members being formed separately from the connection members and being fittingly connected to the connection members.

With the fourth feature of the present invention, the cleaner case includes the bowl-shaped case main body and the cover member, the cover member being detachably attached to the case main body, and the first and second intake ducts are configured with the tubular connection members and the passage forming members, the connection members penetrating the cover member and being attached to the cover member, the passage forming members being formed separately from the connection members and being fittingly connected to the connection members. Therefore, at the time of the maintenance work in a state the cover member is detached from the case main body, the shape of the intake duct can be changed easily and the intake duct can be replaced without depending on the shape of the cleaner case.

According to a fifth feature of the present invention, in addition to the fourth feature, at least one intake duct out of the first and second intake ducts includes the connection member and the passage forming member, the passage forming member being fittingly connected to the connection member in an outside of the cleaner case.

With the fifth feature of the present invention, at least one intake duct includes the connection member and the passage forming member, the passage forming member being fittingly connected to the connection member in the outside of the cleaner case. Therefore, the flow direction of the intake air can be changed inside the unpurified chamber only by changing the connection member configuring the downstream end portion of the intake duct.

According to a sixth feature of the present invention, in addition to the first feature or the second feature, the connection member of one intake duct out of the first and second intake ducts is connected to a connection hole arranged in a flat wall included in the cover member so that the flat wall extends along a flat plane perpendicular to an axis of the connection member, an other intake duct out of the first and second intake ducts is connected to an other connection hole arranged in a slant wall included in the cover member so that the slant wall extends along a flat plane obliquely crossing with an axis of the connection member of the other intake duct, and the connection member of the other intake duct is formed longer corresponding to an opening dimension in a side view of the other connection hole, compared to the connection member of the one intake duct.

With the sixth feature of the present invention, one intake duct is connected to the connection hole arranged in the flat wall of the cover member, the other intake duct is connected to other connection hole arranged in the slant wall of the cover member, and the connection member of the other intake duct is formed longer corresponding to the opening dimension in a side view of the other connection hole, compared to the connection member of the one intake duct. Therefore, the connection member can be connected regardless of the shape of the connection hole even in the connection part to the slant wall, and the degree of freedom of design of the connection position of the intake duct increases regardless of the shape of the cleaner case at the connection part.

According to a seventh feature of the present invention, in addition to the first feature or the second feature, in an on-vehicle state, the first air inlet port is disposed at a front side of a front end of the cleaner case, and the second intake duct is connected to the cover member at a rear side of the connection part of the first intake duct with respect to the cover member, the second intake duct including the second air inlet port at a front side of a rear end of the cleaner case.

With the seventh feature of the present invention, the first air inlet port is disposed at a front side of the front end of the cleaner case, and the second intake duct is connected to the cover member at a rear side of the connection part of the first intake duct with respect to the cover member, the second intake duct including the second air inlet port at a front side of the rear end of the cleaner case. Therefore, the second intake duct is extended inside the unpurified chamber while avoiding protrusion of the second intake duct from the cleaner case to the rear, thereby the air cleaner can be suppressed from becoming large and the occupying space of the air cleaner at the time of being mounted on a vehicle can be reduced without largely changing the suction characteristic by the passage length of the first and second intake ducts.

According to an eighth feature of the present invention, in addition to the first feature or the second feature, the case main body is supported by the body frame so that the cover member above the case main body is disposed above a frame member as seen in a side view, the frame member configuring a part of the body frame.

With the eighth feature of the present invention, the case main body is supported by the body frame so that the cover member is disposed above the frame member configuring a part of the body frame, as seen in a side view. Therefore, in a whole vehicle, maintenance can be executed while the cover member and the cleaner element are escaped sideways above the frame member, and excellent maintainability can be secured.

The above and other objects, characteristics and advantages of the present invention will be clear from detailed descriptions of the preferred embodiment which will be provided below while referring to the attached drawings.

DESCRIPTION OF THE PREFERRED EMBODIMENT

Below, an embodiment of the present invention will be described with reference to FIG. 1 to FIG. 9 attached. Also, in the description below, respective directions of front, rear, up, down, left, and right refer to the directions as viewed by a rider riding on a two-wheeled motor vehicle.

Figure 1:
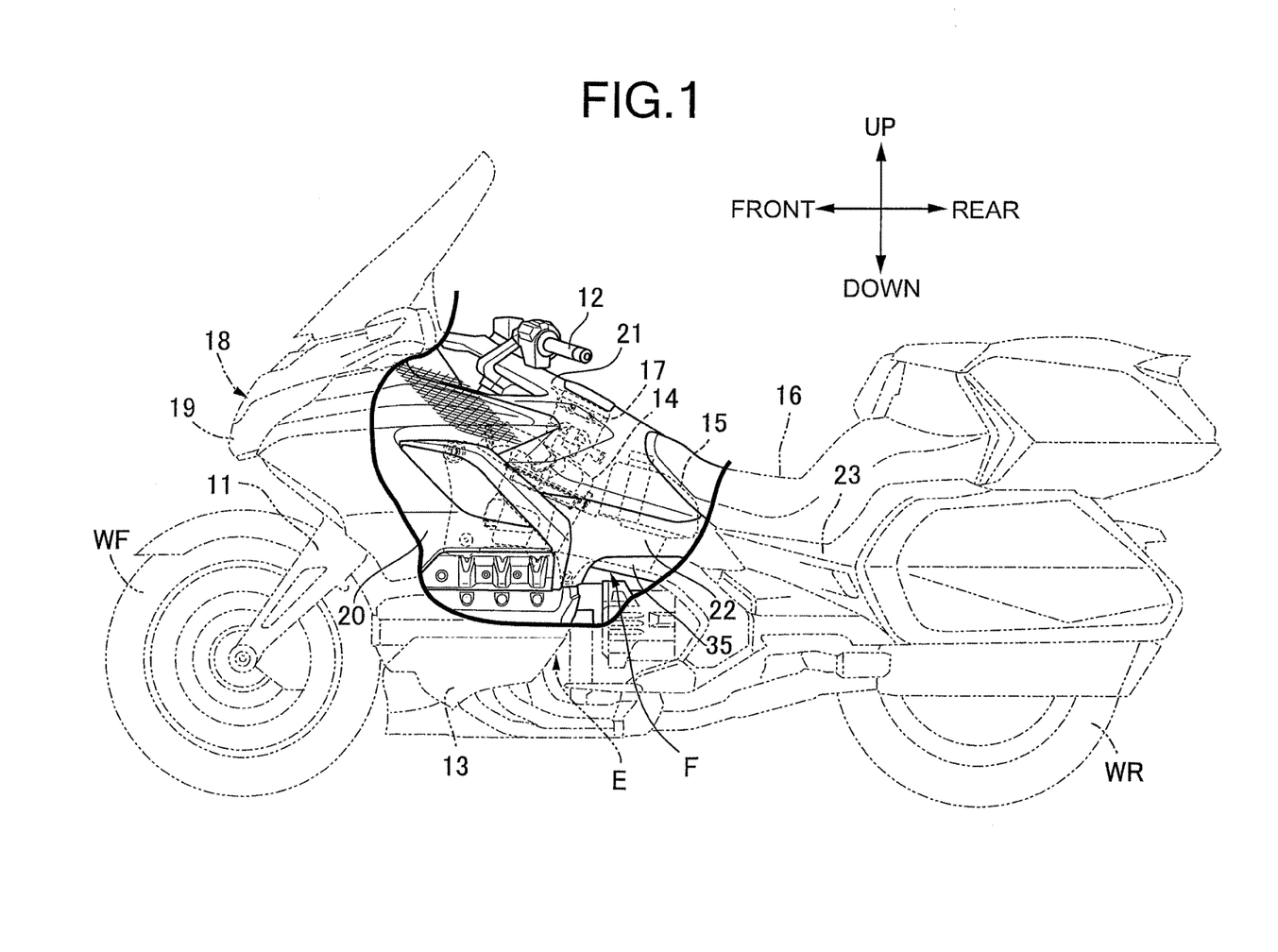
FIG. 1 is a left side view of a two-wheeled motor vehicle.

First, in FIG. 1, at the front end portion of the two-wheeled motor vehicle as a saddle-ride type vehicle, a front fork 11 and a bar-shaped steering handle 12 are steerably supported, the front fork 11 pivotally supporting a front wheel WF, the steering handle 12 continuing to the front fork 11, and an engine body 13 of an engine E is mounted on a body frame F so as to be disposed between the front wheel WF and a rear wheel WR, the engine E exerting power for driving the rear wheel WR suspended from the rear part of the body frame F.

By the body frame F, an air cleaner 14, a fuel tank 15, and a riding seat 16 are supported, the air cleaner 14 being disposed above the engine body 13, the fuel tank 15 being disposed behind the air cleaner 14, the riding seat 16 covering the rear part of the fuel tank 15 from above. Also, an airbag module 17 is disposed above the air cleaner 14.

A part of the body frame F, a part of the engine E including the air cleaner 14, the fuel tank 15, and the airbag module 17 are covered by a body cover 18 formed of a synthetic resin. The body cover 18 includes a front cowl 19, a pair of right and left front side covers 20, a tank shell 21, a pair of right and left side covers 22, and a pair of right and left seat cowls 23, the front cowl 19 covering the front part of the body frame F above the front wheel WF, the pair of right and left front side covers 20 continuing to both right and left sides of the front cowl 19 so as to cover the front part of the air cleaner 14 above the engine body 13 from the side, the tank shell 21 covering the airbag module 17 and the fuel tank 15 from the side and above and continuing to the rear part of the front side covers 20, the pair of right and left side covers 22 being disposed below the front part of the riding seat 16 and continuing to the rear part of the front side covers 20 and the lower part of both sides of the tank shell 21, the pair of right and left seat cowls 23 continuing to the rear part of the side covers 22 so as to cover the part below the riding seat 16 from the side.

Figure 2:
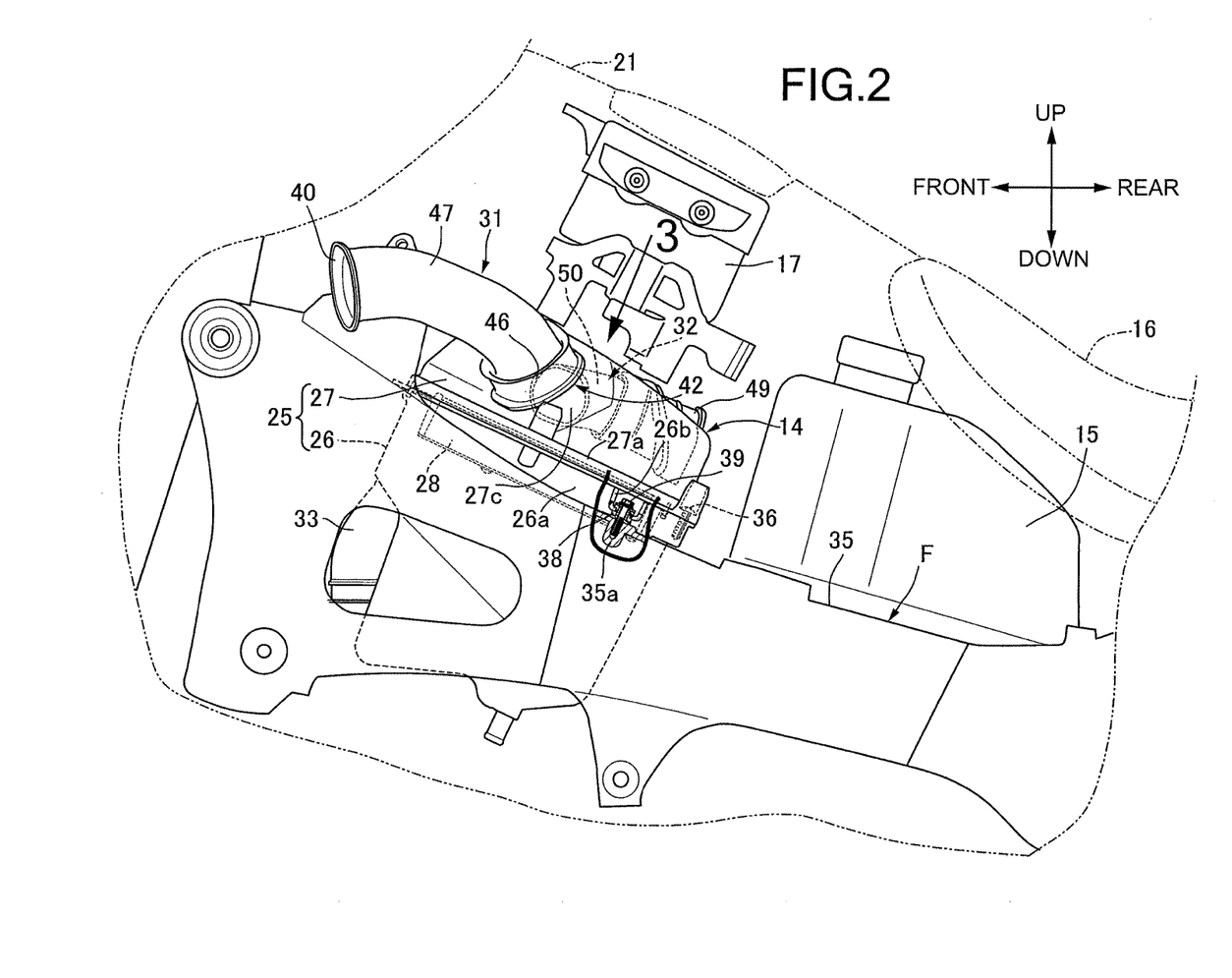
FIG. 2 is a side view showing the vicinity of an air cleaner in a state a body cover is omitted.
Figure 3:
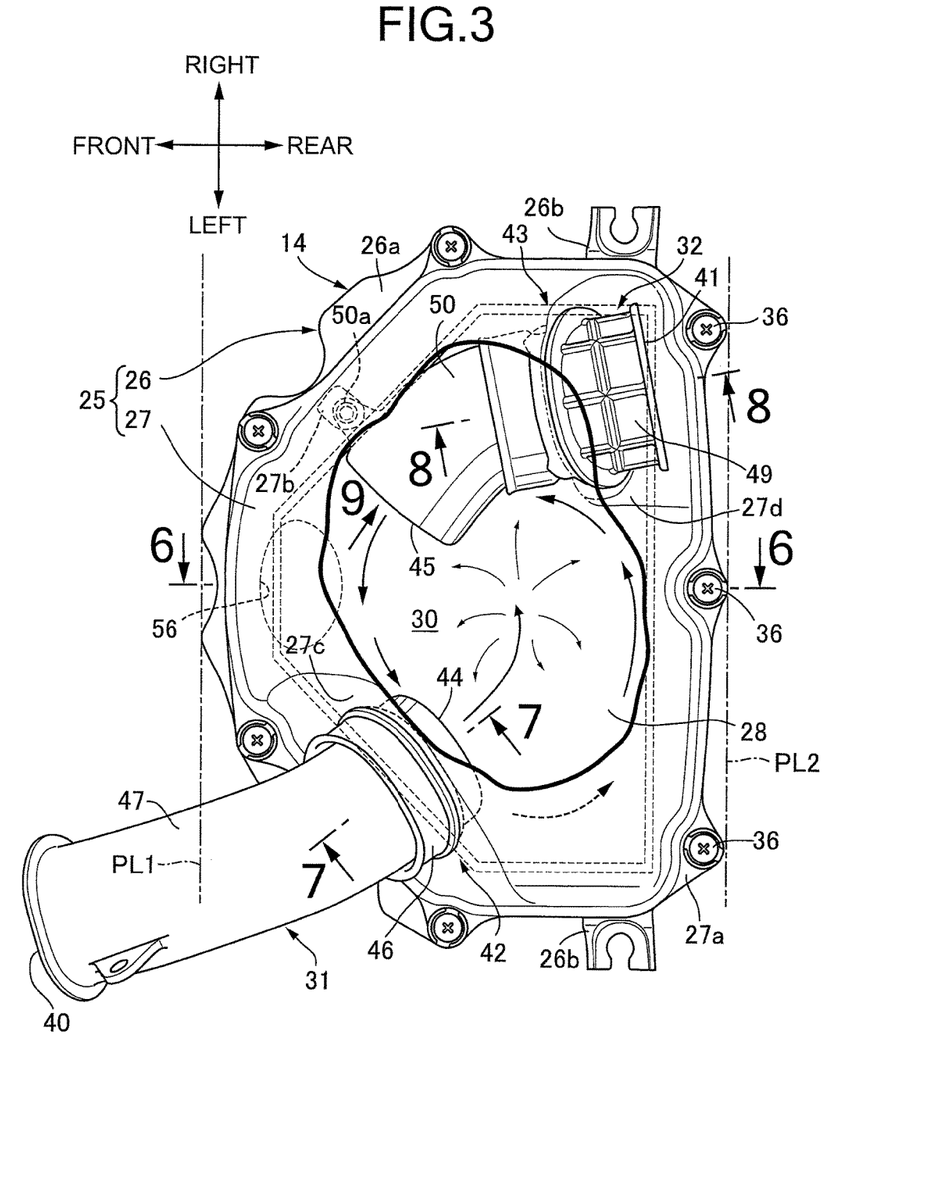
FIG. 3 is a view as viewed along arrow 3 in FIG. 2.
Figure 4:
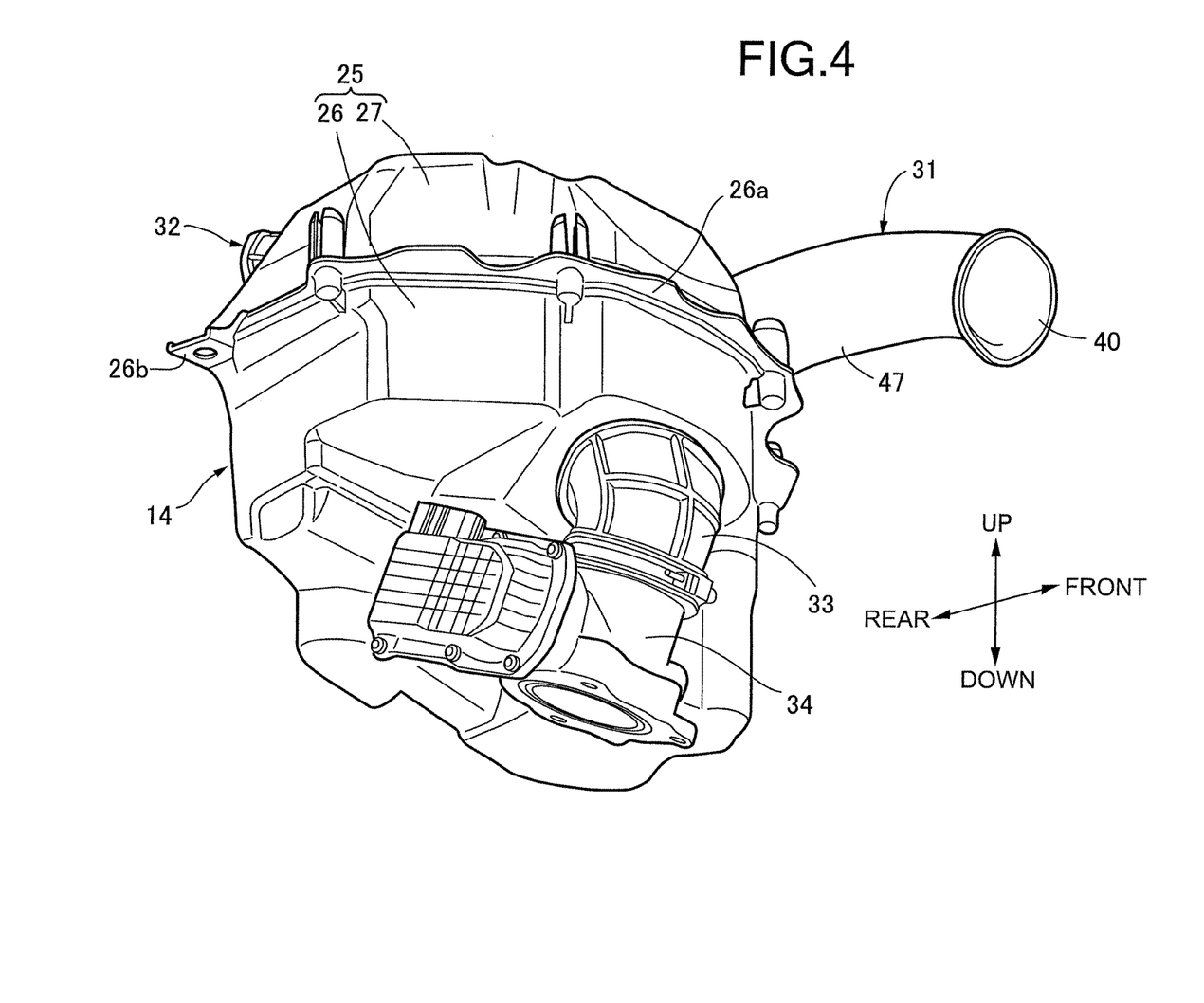
FIG. 4 is a perspective view of the air cleaner as viewed from the lower side of obliquely front in the right.
Figure 5:
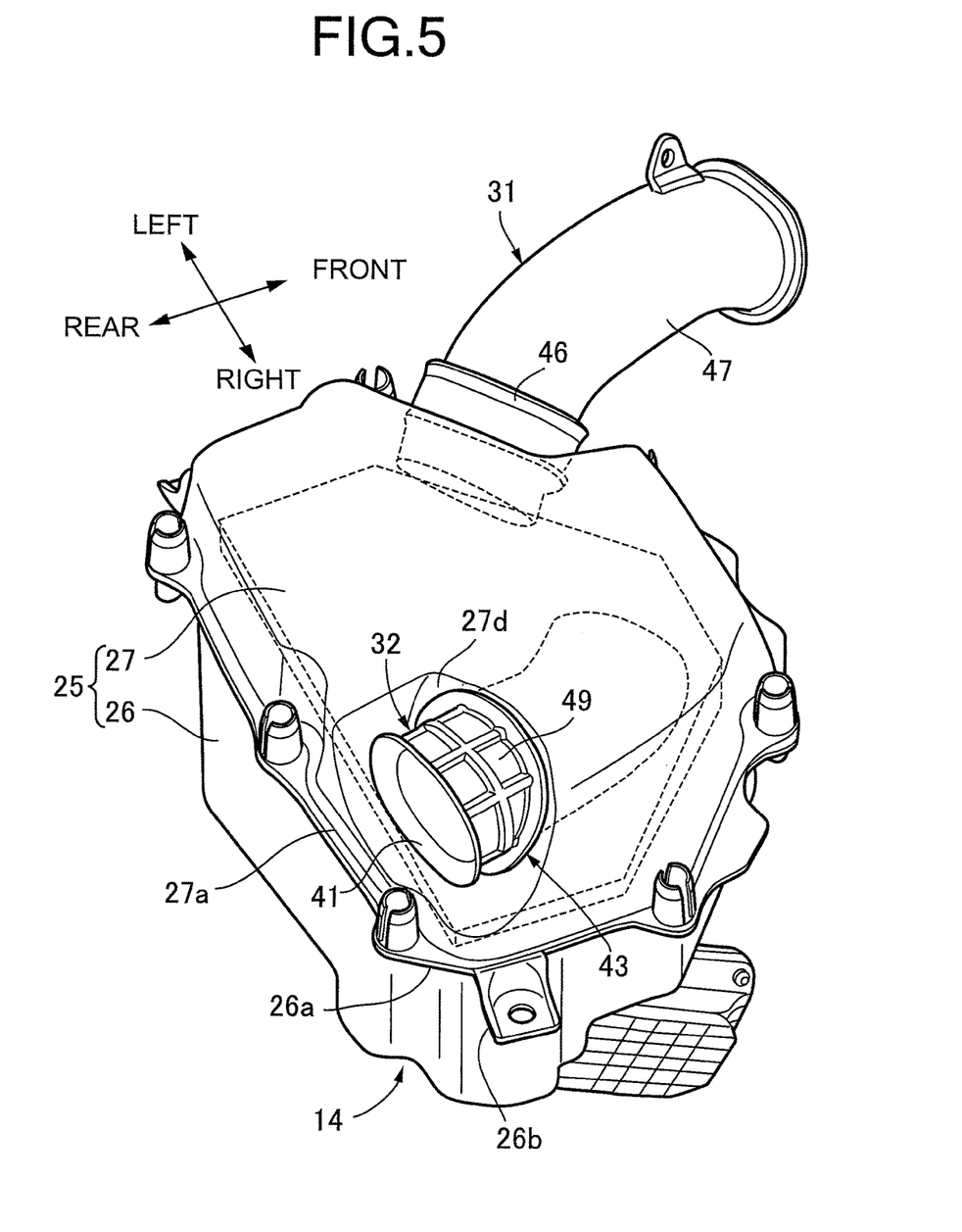
FIG. 5 is a perspective view of the air cleaner as viewed from the upper side of obliquely front in the right.

With reference to FIG. 2 to FIG. 6 also, the air cleaner 14 is configured according to the present invention and includes a cleaner case 25, a cleaner element 28, and a first and second intake ducts 31, 32, and a connecting tube 33 is connected to a throttle body 34 as shown in FIG. 4, the cleaner element 28 being stored inside the cleaner case 25 so as to separate the inside of the cleaner case 25 into a purified chamber 29 and an unpurified chamber 30, the first and second intake ducts 31, 32 being connected to the cleaner case 25 so as to suck the external air to the unpurified chamber 30, the connecting tube 33 introducing the air purified by the air cleaner 14.

The cleaner case 25 includes a bowl-shaped case main body 26 and a cover member 27, the case main body 26 being disposed between a pair of right and left main frames 35 extending rearward and downward as a frame member configuring a part of the body frame F, the cover member 27 being detachably attached to the case main body 26 so as to close the opening end of the case main body 26.

The case main body 26 is formed into a bowl shape opening at the upper end, and the cover member 27 is formed so as to close the upper end opening portion of the case main body 26 and is disposed above the case main body 26. A flange portion 26a is formed in the upper end of the case main body 26 at an outer lateral side in an integral manner, a flange portion 27a opposing the flange portion 26a is formed at the lower end of the cover member 27 in an integral manner, and both of the flange portions 26a, 27a are fastened to each other by screw members 36 disposed at plural positions with intervals in the circumferential direction.

The cleaner element 28 includes an element support frame 37 of a rectangular shape, a clamped portion 37a is formed integrally with the element support frame 37 so as to extend sideways from the element support frame 37, the tip end portion of the clamped portion 37a being limited into a substantially T-shape, and the clamped portion 37a is clamped between the flange portion 26a of the case main body 26 and the flange portion 27a of the cover member 27. In other words, the cleaner element 28 is stored inside the cleaner case 25 so as to vertically separate the inside of the cleaner case 25, the unpurified chamber 30 is formed between the cover member 27 and the cleaner element 28, and the purified chamber 29 is formed between the cleaner element 28 and the case main body 26.

On right and left both sides of the flange portion 26a of the case main body 26, support arms 26b extending to above the pair of right and left main frames 35 are formed integrally, bolts 39 are screwed to boss portions 35a arranged in the upper walls of the main frames 35, the bolts 39 being inserted to mount members 38 made of rubber furnished on the support arms 26b, thereby the case main body 26 comes to be supported by the main frames 35, and the cover member 27 above the case main body 26 is disposed above the main frames 35 as seen in a side view as shown in FIG. 2.

The first intake duct 31 includes a first air inlet port 40 opening forward in an on-vehicle state, and a connection part 42 of the first intake duct 31 with respect to the cleaner case 25 is disposed in the front half portion of one of the left half portion and the right half portion (the left half portion in this embodiment) of the cleaner case 25. The second intake duct 32 includes a second air inlet port 41 opening rearward in an on-vehicle state, and a connection part 43 of the second intake duct 32 with respect to the cleaner case 25 is disposed in the rear half portion of the other of the left half portion and the right half portion (the right half portion in this embodiment) of the cleaner case 25.

Figure 6:
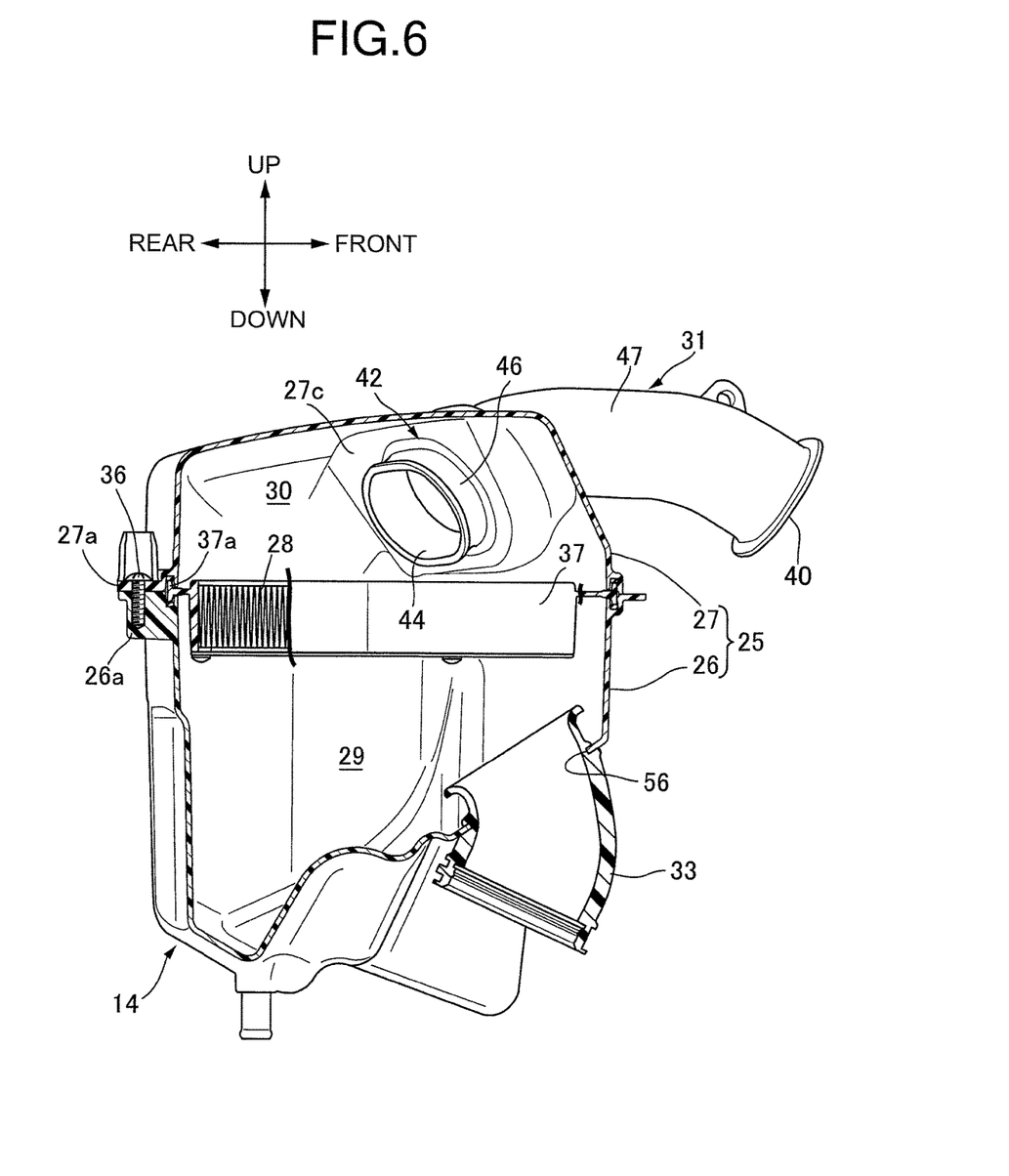
FIG. 6 is a sectional view taken along line 6-6 in FIG. 3.

The first intake duct 31 is formed so as to curve in the up-down direction as shown in FIG. 6 as seen in a side view and so as to have a first air outlet port 44 opening rearward inside the unpurified chamber 30. Also, the second intake duct 32 is formed so as to curve in the right and left direction as shown in FIG. 3 as seen in a plan view and so as to have a second air outlet port 45 opening forward inside the unpurified chamber 30.

The first intake duct 31 is configured with a tubular first connection member 46 and a pipe-shaped first passage forming member 47, the first connection member 46 penetrating the cover member 27 and being attached to the cover member 27, the first passage forming member 47 being formed separately from the first connection member 46 and fittingly connected to the first connection member 46. The second intake duct 32 is configured with a tubular second connection member 49 and a pipe-shaped second passage forming member 50, the second connection member 49 penetrating the cover member 27 and being attached to the cover member 27, the second passage forming member 50 being formed separately from the second connection member 49 and fittingly connected to the second connection member 49.

Furthermore, at least one of the first and second intake ducts 31, 32 namely the first intake duct 31 in the present embodiment is configured with the first connection member 46 and the first passage forming member 47, the first passage forming member 47 being fittingly connected to the first connection member 46 in the outside of the cleaner case 25. On the other hand, the second intake duct 32 is configured with the second connection member 49 and the second passage forming member 50, the second passage forming member 50 being fittingly connected to the second connection member 49 in the inside of the cleaner case 25, and a support protruding portion 50a is fastened to a boss portion 27b, the support protruding portion 50a being protrudingly arranged at the outer circumference of the second passage forming member 50 disposed inside the unpurified chamber 30, the boss portion 27b being arranged in the cover member 27.

Figure 7:
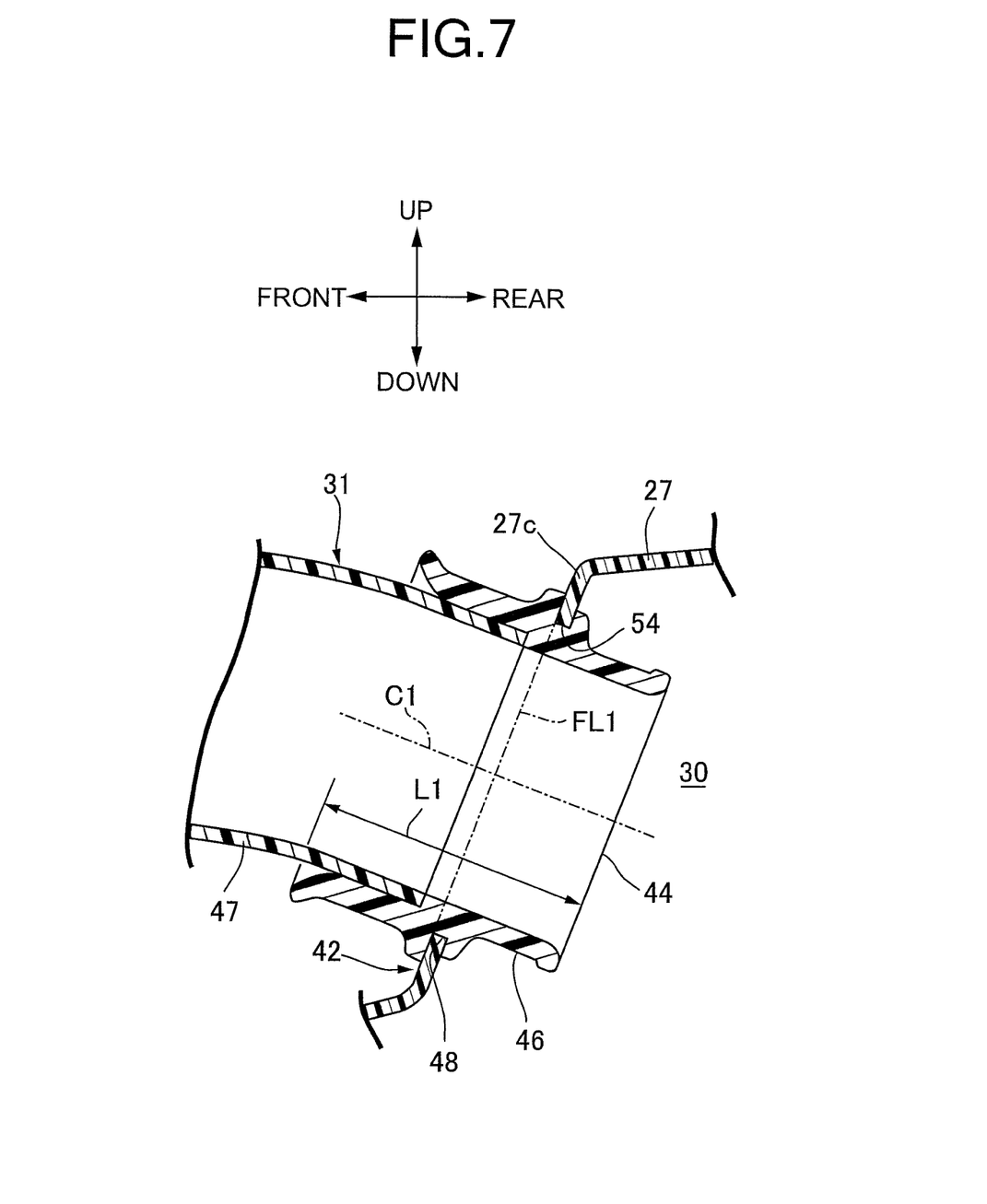
FIG. 7 is a sectional view taken along line 7-7 in FIG. 3.

The connection member of one intake duct out of the first and second intake ducts 31, 32 namely the first connection member 46 of the first intake duct 31 in the present embodiment is connected to a first connection hole 54 as shown in FIG. 7, the first connection hole 54 being arranged in a flat wall 27c, the cover member 27 including the flat wall 27c in the front half portion of the left half portion of the cover member 27 so that the flat wall 27c extends along a flat plane FL1 perpendicular to an axis C1 of the first connection member 46. In other words, the first connection member 46 is formed into a cylindrical shape by an elastic material such as rubber and the like so as to be fitted to the first connection hole 54, and the cover member 27 is engaged with a locking groove 48 at the circumferential edge portion of the first connection hole 54, the locking groove 48 being arranged at the outer circumference of the first connection member 46. That is to say, a part where the first connection member 46 is fittingly locked to the first connection hole 54 becomes the connection part 42 of the first intake duct 31 with respect to the cleaner case 25, the first connection hole 54 being arranged in the front half portion of the left half portion of the cover member 27 in the cleaner case 25.

Figure 8:
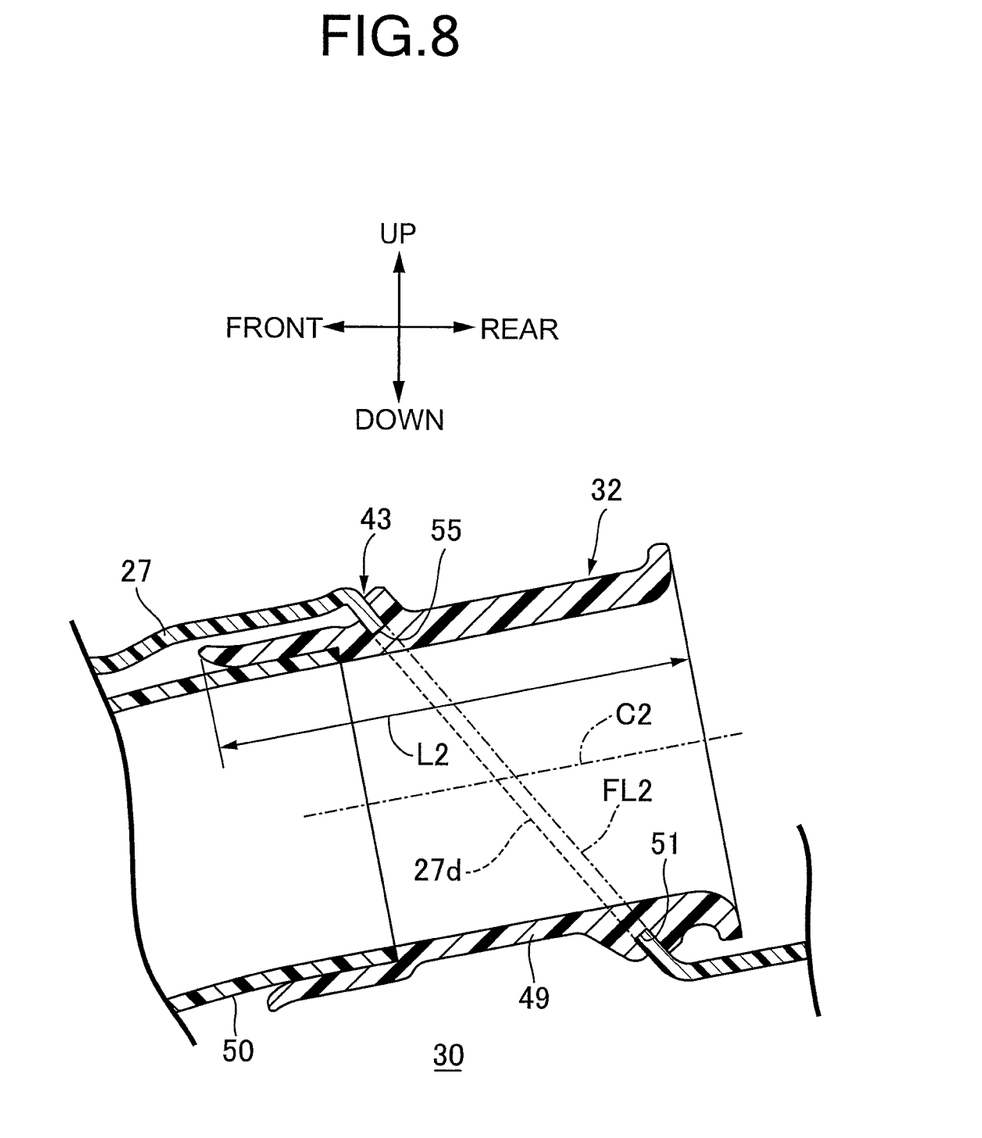
FIG. 8 is a sectional view taken along line 8-8 in FIG. 3.

The connection member of the other intake duct out of the first and second intake ducts 31, 32 namely the second connection member 49 of the second intake duct 32 in the present embodiment is connected to a second connection hole 55 as shown in FIG. 8, the second connection hole 55 being arranged in a slant wall 27d, the cover member 27 including the slant wall 27d in the rear half portion of the right half portion of the cover member 27 so that the slant wall 27d extends along a flat plane FL2 obliquely crossing an axis C2 of the second connection member 49. In other words, the second connection member 49 is formed into a cylindrical shape by an elastic material such as rubber and the like so as to be fitted to the second connection hole 55, and the cover member 27 is engaged with a locking groove 51 at the circumferential edge portion of the second connection hole 55, the locking groove 51 being arranged at the outer circumference of the second connection member 49. That is to say, a part where the second connection member 49 is fittingly locked to the second connection hole 55 arranged in the rear half portion of the right half portion of the cover member 27 in the cleaner case 25 becomes the connection part 43 of the second intake duct 32 with respect to the cleaner case 25.

Also, the second connection member 49 of the second intake duct 32 is formed longer, compared to the first connection member 46 of the first intake duct 31, corresponding to that the opening dimension in a side view of the second connection hole 55 becomes large as shown in FIG. 8. In other words, the length L2 of the second connection member 49 is set to be larger than the length L1 of the first connection member 46 along the axial direction.

Figure 9:
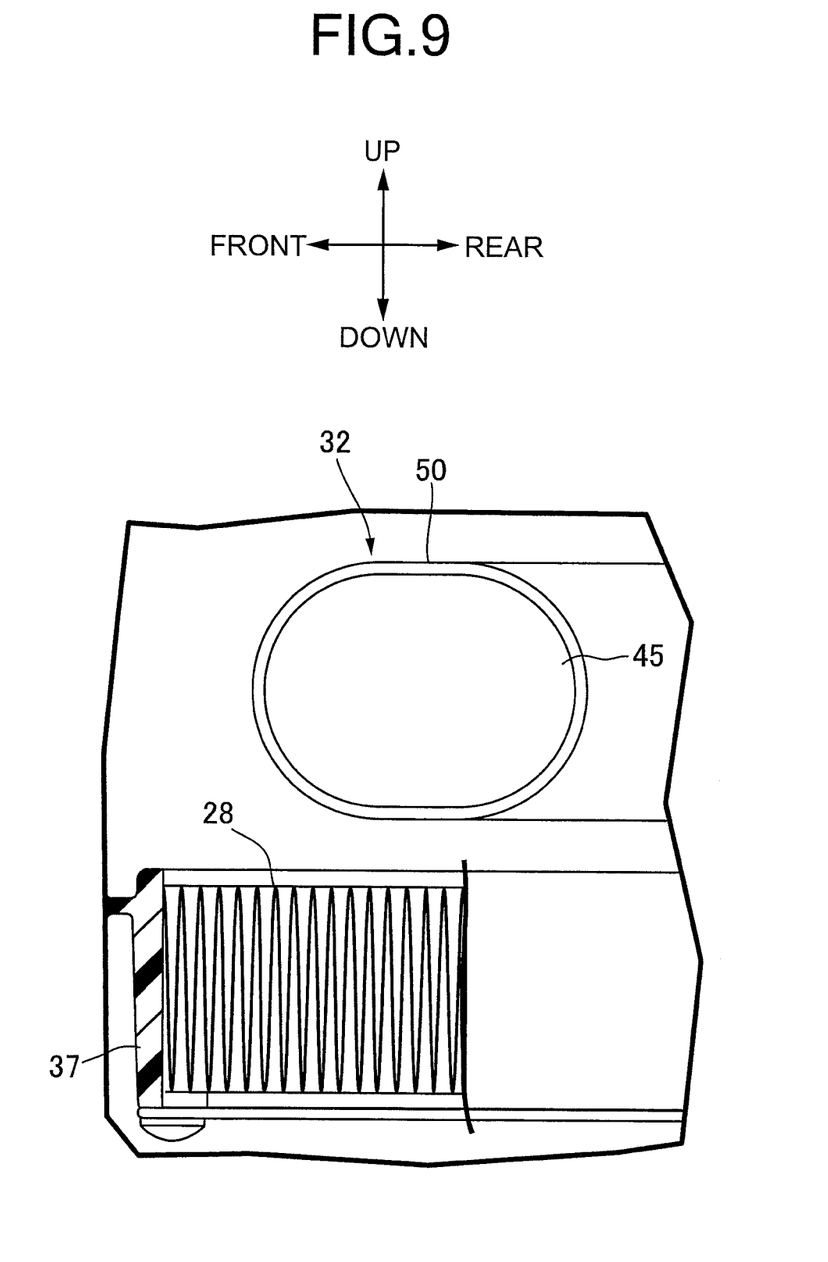
FIG. 9 is a view as viewed along arrow 9 in FIG. 3.

As shown in FIG. 9, the second intake duct 32 has the cross-section with an oval shape, and the second passage forming member 50 out of the second intake duct 32 is disposed so that the major axis direction of the oval shape is allowed to be along a flat plane facing the unpurified chamber 30 of the cleaner element 28 in the inside of the unpurified chamber 30.

A single air discharge hole 56 is arranged at the lower part of the case main body 26 in the cleaner case 25 at a position sandwiched between the first and second air outlet ports 44, 45 in a projection view (the drawing corresponding to FIG. 3) to a plane perpendicular to the circulation direction of the air passing through the cleaner element 28, the air discharge hole 56 discharging purified air from the purified chamber 29, and the connecting tube 33 formed of an elastic material such as rubber and the like is fittingly locked to the air discharge hole 56.

Also, in an on-vehicle state, the first air inlet port 40 is disposed at a front side of the front end of the cleaner case 25, and the second intake duct 32 is connected to the cover member 27 at a rear side of the connection part 42 of the first intake duct 31 with respect to the cover member 27, the second intake duct 32 including the second air inlet port 41 at a front side of the rear end of the cleaner case 25. In other words, as shown in FIG. 3, the first air inlet port 40 of the first intake duct 31 is disposed at a front side of an imaginary vertical plane PL1 passing through the front end of the cleaner case 25, the second air inlet port 41 of the second intake duct 32 is disposed at a front side of an imaginary vertical plane PL2 passing through the rear end of the cleaner case 25, and the connection part 43 of the second intake duct 32 with respect to the cover member 27 is disposed in a rear side of the connection part 42 of the first intake duct 31 with respect to the cover member 27.

Next, an operation of the present embodiment will be described. The connection part 42 of the first intake duct 31 with respect to the cleaner case 25 is disposed in the front half portion of one of the left half portion and the right half portion (the left half portion in this embodiment) of the cleaner case 25, the first intake duct 31 including the first air inlet port 40 opening forward in an on-vehicle state. The connection part 43 of the second intake duct 32 with respect to the cleaner case 25 is disposed in the rear half portion of the other of the left half portion and the right half portion (the right half portion in this embodiment) of the cleaner case 25, the second intake duct 32 including the second air inlet port 41 opening rearward in an on-vehicle state. The first intake duct 31 is formed so as to curve in the up-down direction as seen in a side view so as to have the first air outlet port 44 opening rearward inside the unpurified chamber 30. The second intake duct 32 is formed so as to curve in the right and left direction as seen in a plan view so as to have the second air outlet port 45 opening forward inside the unpurified chamber 30. Therefore, the intake air can be circulated to the front, rear, right and left inside the unpurified chamber 30 as shown by the arrows of FIG. 3 while suppressing mutual interference of the intake air from the first and second air outlet ports 44, 45, and the suction efficiency can be improved and the intake air volume can be increased without increasing the sectional opening area of the intake duct and the number of the intake ducts.

Also, the single air discharge hole 56 is arranged in the cleaner case 25 at a position sandwiched between the first and second air outlet ports 44, 45 in a projection view to a plane perpendicular to the circulation direction of the air passing through the cleaner element 28, the air discharge hole 56 discharging the purified air from the purified chamber 29. Therefore, whirling of the intake air to the front, rear, right and left inside the unpurified chamber 30 is promoted, flow of the air inside the cleaner case 25 is promoted, and the suction efficiency can be further improved.

Also, the second intake duct 32 having the cross-section with an oval shape is disposed inside the unpurified chamber 30 so that the major axis direction of the oval shape is allowed to be along a plane of the cleaner element 28 facing the unpurified chamber 30. Therefore, it is easy to secure a space allowing the air to whirl inside the unpurified chamber 30, and mixing of the intake air inside the unpurified chamber 30 can be promoted.

Also, the cleaner case 25 includes the bowl-shaped case main body 26 and the cover member 27, the case main body 26 being supported by the body frame F, the cover member 27 being detachably attached to the case main body 26 so as to close the opening end of the case main body 26, and the first and second intake ducts 31, 32 are configured with the tubular first and second connection members 46, 49 and the first and second passage forming members 47, 50, the first and second connection members 46, 49 penetrating the cover member 27 and being attached to the cover member 27, the passage forming members 47, 50 being formed separately from the connection members 46, 49 and being fittingly connected to the first and second connection members 46, 49. Therefore, at the time of the maintenance work in a state the cover member 27 is detached from the case main body 26, the shape of the first and second intake ducts 31, 32 can be changed easily and the first and second intake ducts 31, 32 can be replaced without depending on the shape of the cleaner case 25.

Also, the first intake duct 31 includes the first connection member 46 and the first passage forming member 47, the first intake duct 31 being at least one of the first and second intake ducts 31, 32, the first passage forming member 47 being fittingly connected to the first connection member 46 in the outside of the cleaner case 25. Therefore, the flow direction of the intake air can be changed inside the unpurified chamber 30 only by changing the first connection member 46 configuring the downstream end portion of the first intake duct 31.

Also, the first connection member 46 of the first intake duct 31 is connected to the first connection hole 54, the first intake duct 31 being one of the first and second intake ducts 31, 32, the first connection hole 54 being arranged in the flat wall 27c, the cover member 27 including the flat wall 27c so that the flat wall 27c extends along the flat plane FL1 perpendicular to the axis C1 of the first connection member 46. The second intake duct 32 is connected to the second connection hole 55, the second intake duct 32 being the other of the first and second intake ducts 31, 32, the second connection hole 55 being arranged in the slant wall 27d, the cover member 27 including the slant wall 27d so that the slant wall 27d extends along the flat plane FL2 obliquely crossing the axis C2 of the second connection member 49 of the second intake duct 32. The second connection member 49 of the second intake duct 32 is formed longer corresponding to the opening dimension in a side view of the second connection hole 55, compared to the first connection member 46 of the first intake duct 31. Therefore, the second connection member 49 can be connected regardless of the shape of the second connection hole 55 even in the connection part 43 to the slant wall 27d, and the degree of freedom of design of the connection position of the second intake duct 32 increases regardless of the shape of the cleaner case 25 at the connection part 43.

Also, in an on-vehicle state, the first air inlet port 40 is disposed at a front side of the front end of the cleaner case 25, and the second intake duct 32 is connected to the cover member 27 at a rear side of the connection part 42 of the first intake duct 31 with respect to the cover member 27, the second intake duct 32 including the second air inlet port 41 at a front side of the rear end of the cleaner case 25. Therefore, the second intake duct 32 is extended inside the unpurified chamber 30 while avoiding protrusion of the second intake duct 32 from the cleaner case 25 to the rear, thereby the air cleaner 14 can be suppressed from becoming large and the occupying space of the air cleaner 14 at the time of being mounted on a vehicle can be reduced without largely changing the suction characteristic by the passage length of the first and second intake ducts 31, 32.

Also, the case main body 26 is supported by the body frame F so that the cover member 27 above the case main body 26 is disposed above the main frame 35 as seen in a side view, the main frame 35 configuring a part of the body frame F. Therefore, in a whole vehicle, maintenance can be executed while the cover member 27 and the cleaner element 28 are escaped sideways above the main frame 35, and excellent maintainability can be secured. Further, in the present embodiment, the air cleaner 14 is visible from the side by detaching the tank shell 21 from the body cover 18, and the cover member 27 and the cleaner element 28 can be escaped without detaching the airbag module 17 above the air cleaner 14. However, because a part of the first intake duct 31 is covered from the side by the front side cover 20, when the first passage forming member 47 is detached from the first connection member 46, the cover member 27 and the cleaner element 28 can be escaped sideways more easily.

An embodiment of the present invention is explained above, but the present invention is not limited to the above-mentioned embodiment and may be modified in a variety of ways as long as the modifications do not depart from the gist of the present invention.

What is claimed is:

1. An air cleaner for a vehicle, comprising:
   a cleaner case;
   a cleaner element stored within the cleaner case so as to separate an inside of the cleaner case into a purified chamber and an unpurified chamber; and
   first and second intake ducts connected to the cleaner case so as to suck external air to the unpurified chamber,
   wherein a connection part of the first intake duct with respect to the cleaner case is disposed in a front half portion of one of a left half portion and a right half portion of the cleaner case, the first intake duct including a first air inlet port opening forward in an on-vehicle state,
   a connection part of the second intake duct with respect to the cleaner case is disposed in a rear half portion of an other of the left half portion and the right half portion of the cleaner case, the second intake duct including a second air inlet port opening rearward in the on-vehicle state,
   the first intake duct is formed so as to include a first air outlet port and curve in an up-down direction as seen in a side view, the first air outlet port opening rearward in an inside of the unpurified chamber, and
   the second intake duct is formed so as to include a second air outlet port and curve in a right and left direction as seen in a plan view, the second air outlet port opening forward in the inside of the unpurified chamber,
   wherein, in the on-vehicle state, the first air inlet port is disposed at a front side of a front end of the cleaner case, and
   the second intake duct is connected to a cover member of the cleaner case at a rear side of the connection part of the first intake duct with respect to the cover member, the second intake duct including the second air inlet port at a front side of a rear end of the cleaner case.

2. The air cleaner for a vehicle according to claim 1, wherein a single air discharge hole is arranged in the cleaner case at a position sandwiched between the first and second air outlet ports in a projection view to a plane perpendicular to a circulation direction of air passing through the cleaner element, the air discharge hole discharging purified air from the purified chamber.

3. The air cleaner for a vehicle according to claim 1, wherein the second intake duct having a cross-section with an oval shape is disposed inside the unpurified chamber so that a major axis direction of the oval shape is allowed to be along a plane of the cleaner element facing the unpurified chamber.

4. The air cleaner for a vehicle according to claim 1, wherein the cleaner case includes a bowl-shaped case main body and the cover member, the case main body being supported by a body frame, the cover member being detachably attached to the case main body so as to close an opening end of the case main body, and the first and second intake ducts are configured with tubular connection members and passage forming members, the connection members penetrating the cover member and being attached to the cover member, the passage forming members being formed separately from the connection members and being fittingly connected to the connection members.

5. The air cleaner for a vehicle according to claim 4, wherein at least one intake duct out of the first and second intake ducts includes the connection member and the passage forming member, the passage forming member being fittingly connected to the connection member in an outside of the cleaner case.

6. The air cleaner for a vehicle according to claim 1, wherein the connection member of one intake duct out of the first and second intake ducts is connected to a connection hole arranged in a flat wall included in the cover member so that the flat wall extends along a flat plane perpendicular to an axis of the connection member, an other intake duct out of the first and second intake ducts is connected to an other connection hole arranged in a slant wall included in the cover member so that the slant wall extends along a flat plane obliquely crossing with an axis of the connection member of the other intake duct, and the connection member of the other intake duct is formed longer corresponding to an opening dimension in a side view of the other connection hole, compared to the connection member of the one intake duct.

7. The air cleaner for a vehicle according to claim 1, wherein the case main body is supported by the body frame so that the cover member above the case main body is disposed above a frame member as seen in a side view, the frame member configuring a part of the body frame.

8. The air cleaner for a vehicle according to claim 2, wherein the second intake duct having a cross-section with an oval shape is disposed inside the unpurified chamber so that a major axis direction of the oval shape is allowed to be along a plane of the cleaner element facing the unpurified chamber.

9. The air cleaner for a vehicle according to claim 2, wherein the cleaner case includes a bowl-shaped case main body and the cover member, the case main body being supported by a body frame, the cover member being detachably attached to the case main body so as to close an opening end of the case main body, and the first and second intake ducts are configured with tubular connection members and passage forming members, the connection members penetrating the cover member and being attached to the cover member, the passage forming members being formed separately from the connection members and being fittingly connected to the connection members.

10. The air cleaner for a vehicle according to claim 2, wherein the connection member of one intake duct out of the first and second intake ducts is connected to a connection hole arranged in a flat wall included in the cover member so that the flat wall extends along a flat plane perpendicular to an axis of the connection member, an other intake duct out of the first and second intake ducts is connected to an other connection hole arranged in a slant wall included in the cover member so that the slant wall extends along a flat plane obliquely crossing with an axis of the connection member of the other intake duct, and the connection member of the other intake duct is formed longer corresponding to an opening dimension in a side view of the other connection hole, compared to the connection member of the one intake duct.

11. The air cleaner for a vehicle according to claim 2, wherein the case main body is supported by the body frame so that the cover member above the case main body is disposed above a frame member as seen in a side view, the frame member configuring a part of the body frame.

* * * * *